US011825334B2

(12) United States Patent
Kim et al.

(10) Patent No.: US 11,825,334 B2
(45) Date of Patent: Nov. 21, 2023

(54) METHOD AND DEVICE FOR TRANSMITTING DATA IN WIRELESS COMMUNICATION SYSTEM

(71) Applicant: Samsung Electronics Co., Ltd., Suwon-si (KR)

(72) Inventors: Sunghoon Kim, Suwon-si (KR); Suyoung Park, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 17/431,117

(22) PCT Filed: Feb. 17, 2020

(86) PCT No.: PCT/KR2020/002214
§ 371 (c)(1),
(2) Date: Aug. 13, 2021

(87) PCT Pub. No.: WO2020/167087
PCT Pub. Date: Aug. 20, 2020

(65) Prior Publication Data
US 2022/0053364 A1    Feb. 17, 2022

(30) Foreign Application Priority Data
Feb. 15, 2019  (KR) .......... 10-2019-0018144
Nov. 4, 2019   (KR) .......... 10-2019-0139784

(51) Int. Cl.
*H04W 28/02*   (2009.01)
*H04W 28/24*   (2009.01)
(Continued)

(52) U.S. Cl.
CPC ....... *H04W 28/0268* (2013.01); *H04W 28/24* (2013.01); *H04W 36/0044* (2013.01); *H04W 36/14* (2013.01)

(58) Field of Classification Search
CPC ............. H04W 28/0268; H04W 28/24; H04W 36/0044; H04W 36/14; H04W 76/22; H04W 28/02; H04W 76/27
See application file for complete search history.

(56) References Cited

U.S. PATENT DOCUMENTS 7,076,552 B2    7/2006  Mandato
10,129,766 B2 *  11/2018  Chen .................... H04W 24/02
(Continued)

FOREIGN PATENT DOCUMENTS

KR    10-2007-0121826 A    12/2007
KR    10-2020-0039410 A    4/2020

OTHER PUBLICATIONS

"5G; Procedures for the 5G System (3GPP TS 23.502 version 15.3.0 Release 15)", ETSI TS 123 502 V15.3.0, Sep. 17, 2018, 330 pages.
(Continued)

*Primary Examiner* — Ahmed Elallam

(57) ABSTRACT

The disclosure relates to a method and apparatus for monitoring and changing information about quality of service (QoS) allowed to be supported to a user equipment (UE) in a mobile communication system, and an operating method of a target base station (BS) in the mobile communication system includes receiving, from a source BS, alternative quality of service (QoS) profile (AQP) information, determining whether information matching QoS information allowed to be supported for a UE to be served is included in the AQP information, and when the information matching the QoS information allowed to be supported for the UE to be served is included in the AQP information, transmitting
(Continued)

the matching information to an access and mobility management function (AMF).

16 Claims, 8 Drawing Sheets

(51) Int. Cl.
*H04W 36/00* (2009.01)
*H04W 36/14* (2009.01)

(56) References Cited

U.S. PATENT DOCUMENTS

| | | | |
|---|---|---|---|
| 2002/0010771 A1 | 1/2002 | Mandato | |
| 2006/0276189 A1 | 12/2006 | Kiernan et al. | |
| 2016/0192261 A1* | 6/2016 | Wang | H04W 36/30 370/331 |
| 2020/0112841 A1 | 4/2020 | Kim et al. | |
| 2020/0112907 A1* | 4/2020 | Dao | H04M 15/84 |
| 2021/0136620 A1* | 5/2021 | Laitila | H04W 76/27 |
| 2021/0400448 A1* | 12/2021 | Adjakple | H04W 4/40 |
| 2022/0132603 A1* | 4/2022 | Adjakple | H04W 8/005 |
| 2022/0159504 A1* | 5/2022 | Wei | H04W 28/0268 |
| 2022/0167217 A1* | 5/2022 | Wei | H04W 28/0268 |
| 2022/0295338 A1* | 9/2022 | Ebrahim Rezagah | H04W 28/24 |
| 2022/0312509 A1* | 9/2022 | Kim | H04W 28/0268 |

OTHER PUBLICATIONS

Han, "LS on Notification Control during Handover", 3GPP TSG SA WG2 Meeting #S2-130, Dec. 19, 2018, S2-1900010, 3 pages.
Qualcomm Incorporated, "QoS Notification Control during handover", 3GPP TSG-SA WG2 Meeting #130, Jan. 21-25, 2019, S2-1900172, 3 pages.
International Search Report dated May 25, 2020 in connection with International Patent Application No. PCT/KR2020/002214, 2 pages.
Written Opinion of the International Searching Authority dated May 25, 2020 in connection with International Patent Application No. PCT/KR2020/002214, 4 pages.
European Patent Office, "Supplementary European Search Report" dated Feb. 16, 2022, in connection with European Patent Application No. 20756207.5, 11 pages.
Ericsson: "RAN initiated QoS flow/PDU session release," R3-182150, 3GPP TSG-RAN WG3 Meeting #99bis, Sanya, P.R. China, Apr. 16-20, 2018, 10 pages.

* cited by examiner

METHOD AND DEVICE FOR TRANSMITTING DATA IN WIRELESS COMMUNICATION SYSTEM

CROSS-REFERENCE TO RELATED APPLICATIONS

This application is a 371 of International Application No. PCT/KR2020/002214 filed on Feb. 17, 2020, which claims priority to Korean Patent Application No. 10-2019-0018144 filed on Feb. 15, 2019 and Korean Patent Application No. 10-2019-0139784 filed on Nov. 4, 2019, the disclosures of which are herein incorporated by reference in their entireties.

BACKGROUND

1. Field

The disclosure relates to a method of transmitting data in a wireless communication system. The disclosure may include a method of monitoring and changing information about quality of service (QoS) allowed to be provided for a user equipment in a wireless communication system.

2. Description of Related Art

To meet the ever-increasing demand with respect to wireless data traffic since the commercialization of the 4G communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. The 5G communication system defined by the 3rd Generation Partnership Project (3GPP) is called a new radio (NR) system. Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range of radio waves in the ultra-frequency bands, beamforming, massive multiple-input multiple-output (MIMO), full dimensional MIMO (FD-MIMO), array antennas, analog beamforming, and large-scale antenna techniques are under discussion for the 5G communication system and are applied to an NR system. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart home, smart buildings, smart cities, smart cars or connected cars, smart grid, health care, smart home appliances and advanced medical services through convergence and combination between existing information technologies (IT) and various industrial applications.

In this regard, various attempts to apply the 5G communication system to the IoT network are being made. For example, 5G communication such as a sensor network, M2M, MTC, etc., is implemented by such techniques as beamforming, MIMO, and array antenna, etc. Even application of a cloud radio access network (cloud RAN) as the aforementioned big data processing technology may be an example of convergence of 5G and IoT technologies.

With the development of the aforementioned technologies and mobile communication systems, it is possible to provide various services, and there is a need for a method to provide the services effectively.

Embodiments of the disclosure may provide an apparatus and method capable of effectively providing a service in a mobile communication system.

SUMMARY

According to an embodiment of the disclosure, an operating method of a target base station in a mobile communication system includes receiving alternative quality of service (QoS) profile (AQP) information from a source base station, determining whether information matching QoS information allowed to be supported for a user equipment to be served is included in the AQP information, and when the information matching the QoS information allowed to be supported for the UE to be served is included in the AQP information, transmitting the matching information to an access and mobility management function (AMF).

According to embodiments of the disclosure, services may be effectively provided in a mobile communication system.

DETAILED DESCRIPTION

Figure 1:
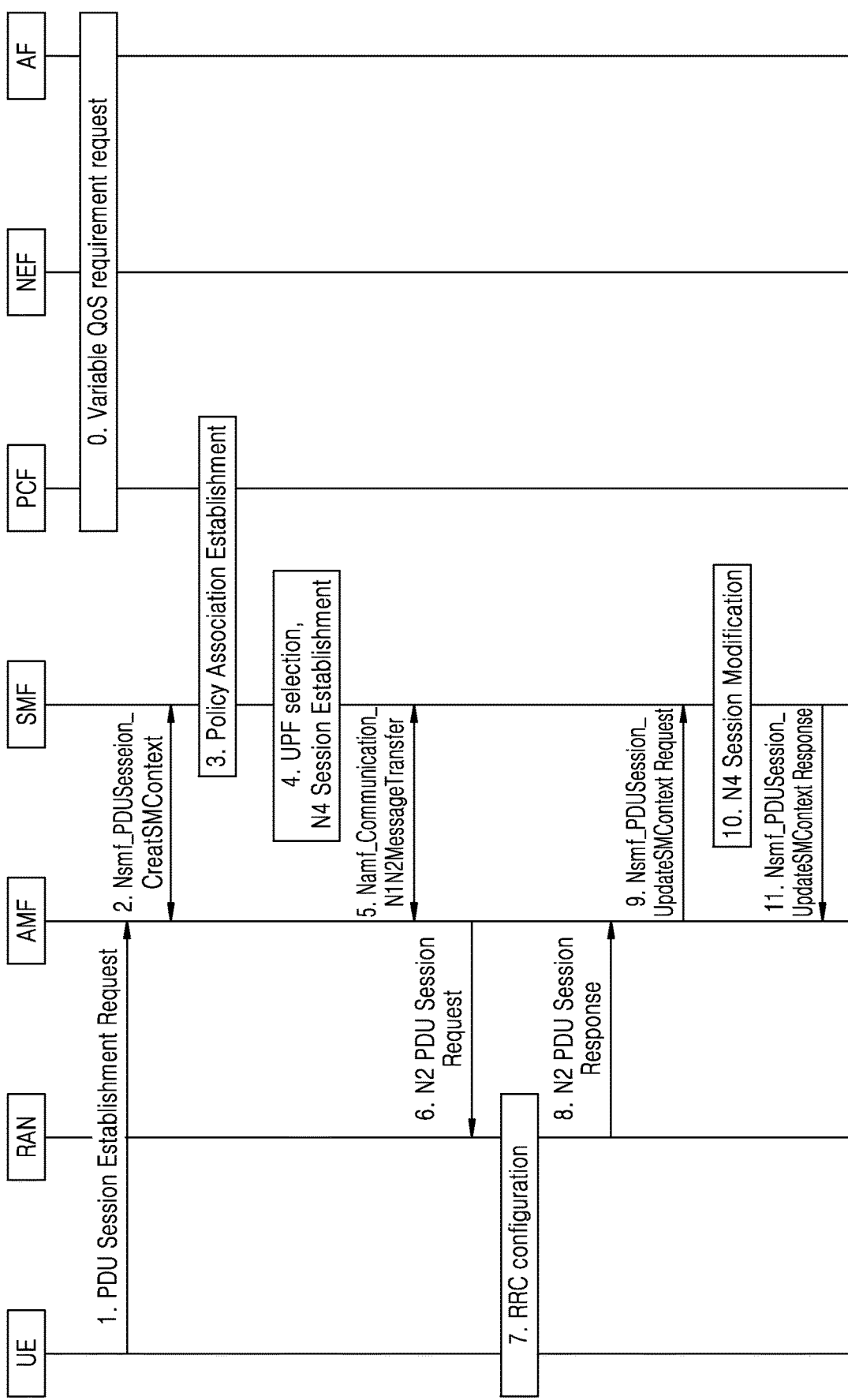
FIG. 1 is a diagram for describing a method of configuring a base station (BS) with a monitoring event for a QoS level during protocol data unit (PDU) session establishment, according to an embodiment.

According to an embodiment of the disclosure, an operating method of a target base station (BS) in a mobile communication system includes receiving, from a source BS, alternative quality of service (QoS) profile (AQP) information, determining whether information matching QoS information allowed to be supported for a user equipment (UE) to be served is included in the AQP information, and when the information matching the QoS information allowed to be supported for the UE to be served is included in the AQP information, transmitting the matching information to an access and mobility management function (AMF).

In an embodiment, the determining of whether the information matching the QoS information allowed to be supported for the UE to be served is included in the AQP information may include determining whether there is, in the AQP information, information matching a guaranteed flow bit rate (GFBR), a packet error rate (PER) or a packet delay budget (PDB) for the target BS to be able to support the UE to be served.

In an embodiment, the transmitting of the matching information to the AMF may include transmitting the matching information in a path switching request message.

In an embodiment, the handover may include inter-BS handover (Xn handover).

In an embodiment, after completion of handover, the method may further include serving the UE based on the matching information.

In an embodiment, the source BS may include a BS serving the UE based on the AQP information.

In an embodiment, the AQP information may be included in a QoS flow level QoS parameter or guaranteed bit rate (GBR) QoS flow information included in the QoS flow level QoS parameter.

According to an embodiment of the disclosure, a target BS in a mobile communication system includes a communication device, at least one memory including instructions, and at least one processor configured to execute the instructions to control to receive, from a source BS, alternative QoS profile (AQP) information, determine whether information matching QoS information allowed to be supported for a UE to be served is included in the AQP information, and when the information matching the QoS information allowed to be supported for the UE to be served is included in the AQP information, transmit the matching information to an AMF.

In an embodiment, the at least one processor may be configured to determine whether there is, in the AQP information, information matching a GFBR, a PER or a PDB for the target BS to be able to support the UE to be served.

In an embodiment, the at least one processor may be configured to control the matching information to be transmitted in a path switching request message.

In an embodiment, the handover may include inter-BS handover (Xn handover).

In an embodiment, the at least one processor may be configured to control to serve the UE based on the matching information after completion of handover.

In an embodiment, the source BS may include a BS serving the UE based on the AQP information.

In an embodiment, the AQP information may be included in a QoS flow level QoS parameter or GBR QoS flow information included in the QoS flow level QoS parameter.

Embodiments of the disclosure will now be described in detail with reference to accompanying drawings. Technological content well-known in the art or not directly related to the disclosure will be omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers may refer to like elements throughout the specification.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is to be noted that the functions described in the blocks may occur out of order in some alternative embodiments. For example, two successive blocks may be performed substantially at the same time or in reverse order.

The term "module" (or sometimes "unit") as used herein refers to a software or hardware component, such as field programmable gate array (FPGA) or application specific integrated circuit (ASIC), which may perform some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments, the module may include one or more processors.

Although embodiments of the disclosure will be primarily focused on a radio access network with a 5G network standard defined by the third generation partnership project (3GPP) and a core network, a next-generation radio access network (NG-RAN) and a packet core (5G system or 5G core network), the subject matter of the disclosure may also be applicable to other communication systems with a similar technical background with minor changes without significantly departing from the scope of the disclosure, which may be possible under the determination of those of ordinary skill in the art to which the disclosure pertains.

For convenience of explanation, some of the terms and names defined by the 3rd generation partnership project long term evolution (3GPP LTE) will be used hereinafter. The disclosure is not, however, limited to the terms and definitions, and may be equally applied to any systems that conform to other standards.

Entities that appear in the disclosure will be as follows:

A user equipment (UE) may be connected to a radio access network (RAN) to access a device for performing a mobility management function of a 5G core network device. In the disclosure, for example, the aforementioned device will be referred to as an access and mobility management function (AMF). The aforementioned device may refer to a function or a device in charge of both an access to the RAN and mobility management of the UE. A session management function (SMF) may be a name of a network function for performing a session management function. The AMF may be connected to the SMF, and the AMF may route, to the SMF, a message related to a session for the UE. The SMF may be connected to a user plane function (UPF) to establish a tunnel through which to transmit data between the BS and the UPF by allocating a user plane resource to be provided for the UE. A PCF is the acronym of "policy & charging function", and may control information relating to QoS policy and charging of a PDU session used by the UE. The PCF may configure and deliver a policy and charging control (PCC) rule to the SMF, which may in turn provide a QoS profile to the RAN based on the PCC rule and allocate a radio resource for the UE to suit the QoS profile.

The respective network functions (NFs) define services they provide, which are defined in the standard as Npcf, Nsmf, Namf, Nnef, etc. For example, the AMF may use a service called Nsmf_PDUSession_CreateSMContext (or an application programming interface (API)) to deliver a session-related message to the SMF.

In an embodiment of the disclosure, the BS may notify the 5G core network of a QoS level of a radio bearer that may be supported for the UE, based on which the 5G core network may change or add a QoS flow of a protocol data unit (PDU) session used by the UE to suit an optimal QoS level. In an embodiment, when a radio condition becomes worse and the QoS level that may be provided for the UE becomes lower, the BS may notify this to the 5G core network to apply a QoS flow of the lower QoS level. Furthermore, when a radio condition becomes better and the QoS level that may be provided for the UE becomes higher, the BS may notify this to the 5G core network to apply a QoS flow of the better QoS level.

In an embodiment of the disclosure, a third application server may determine what QoS level is currently used by the UE based on a QoS level negotiated with the 5G core network, and change a level of the service provided for the UE. For example, an application server for provides an autonomous driving service may adjust a level of automation based on the QoS level currently used by the UE. Accordingly, the application server may change the autonomous driving mode to a driver intervention mode from a fully autonomous driving mode or to the fully autonomous driving mode from the driver intervention mode.

Furthermore, in an embodiment of the disclosure, when the UE moves and handover occurs, the target BS may notify the 5G core network of a QoS level that may be provided for the UE during the handover procedure, thereby allowing a QoS flow according to the QoS level to be more quickly applied.

In an embodiment of the disclosure, when a guaranteed bit rate (GBR) QoS flow is required for a PDU session used by the UE, an event for monitoring a QoS level that may be currently supported for the UE may be configured for the BS. Based on this, the BS may determine a QoS level it is able to provide for the UE and notify the core network of the QoS level.

In an embodiment of the disclosure, when the UE is handed over to another BS, the target BS may determine a QoS level that may be supported by the target BS based on the QoS level monitoring information configured for the UE, and notify the core network of the QoS level.

FIG. 1 is a diagram for describing a method of configuring a BS with a monitoring event of a QoS level during PDU session establishment, according to an embodiment. A first embodiment may be described based on FIG. 1.

In operation 0, an application function (AF) and a PCF may negotiate a QoS level required for a service that the AF provides to the UE. In this case, the AF and the PCF may negotiate using an identity (ID) of a particular UE, and the UE's ID may be an ID that may be mapped to a unique identifier of the UE used in the mobile communication network. It may all be applied to a particular service without an ID of the particular UE, in which case the AF and the PCF may negotiate based on data network name (DNN) or network slice information, or an application function ID. Furthermore, in operation 0, the PCF may determine whether a request received from the AF is a request for a vehicle-to-everything (V2X) service, and determine whether the UE corresponding to the request from the AF is a UE that may use the V2X service based on subscriber information or policy information. When the request from the AF is a QoS request for the V2X service and the UE is authorized to be able to use the V2X service, the PCF may confirm the request. The QoS level may be a value determined by service level agreement between a mobile communication operator and a third service provider, and may be configured with a list. For example, values of QoS levels 1 to 10 may be defined and then QoS values (GBRs, maximum bitrates (MBRs), packet delay budgets (PDBs), and packet error rates (PERs)) corresponding to the levels may be defined in the network. Accordingly, the PCF may configure a QoS rule to be applied to the UE. For example, as for an AF for providing an autonomous driving service, the AF may set a QoS requirement depending on an autonomous driving level and send the QoS requirement to a PCF, which may in turn configure a corresponding QoS rule. In another example, as for an AF for providing an emergency management service, the AF may set a QoS requirement depending on a media format and send the QoS requirement to a PCF, which may in turn configure a corresponding QoS rule. In operation 0, the AF may configure the PCF to receive a notification about what QoS level is to be used by the UE, in addition to negotiation of a QoS level required to provide a service to the UE. As a result, the AF may receive a notification about a changed QoS level for the UE from the PCF and may change the QoS of the service provided for the UE based on the notification. For example, the AF may change an autonomous driving level, or may change a media format (a resolution, fps, etc.). Operation 0 may occur at any time before operation 3.

In operation 1, to establish a PDU session, the UE may configure a PDU session establishment request, which is a session management (SM) non-access stratum (NAS) message, and send it to an AMF. The UE may include a data network name (DNN) that the UE intends to use in the PDU session establishment message, which may later be used when an SM or a PCF determines whether the DNN is authorized to apply the monitoring event for a QoS level. Furthermore, the UE may include, in the PDU session establishment message, an ID of an application server to be connected in a PDU session (or application function ID), which may later be used when a PCF determines whether the PDU session is authorized to apply the monitoring event for a QoS level. Moreover, the UE may send an identifier indicating that GBR establishment is wanted or 5QI (QoS indication used in the 5G) corresponding to the GBR in a PDU session establishment request. This may indicate that the UE intends to use the GBR for the PDU session. In another example, the UE may include an identifier indicating that the PDU session requires a function proposed in the disclosure, a QoS level monitoring function. An SMF that receives this information may deliver the aforementioned information to a PCF, and the information may be taken into account by the PCF to establish session-related policy association.

In operation 2, the AMF may select an SMF and deliver a Nsmf_PDUSession_CreateSMContext request message to the selected SMF. The AMF may include, in this message, the PDU session establishment request message received from the UE.

In operation 3, the SMF may identify the PDU session establishment request message received from the UE and perform an SM policy association establishment procedure with the PCF for the corresponding DNN. In this case, the SMF may send the DNN or AF ID requested by the UE to the PCF. On receiving this, the PCF may configure a session related policy to be sent to the SMF and send it. In this case, based on the information according to operation 0, when the PCF has a QoS level according to the request from the AF set for the PDU session used by the UE identified by a DNN or an AF ID, the PCF may configure a session related policy based on the information. For example, when there is a QoS level requiring a GBR QoS flow among QoS levels requested by the AF, the PCF may configure a QoS rule to include the GBR QoS flow among QoS flows to be established for the UE. Furthermore, the PCF may configure configuration information for QoS level monitoring according to the QoS level requested by the AF and include it in a session related policy. This information may later be transferred to a RAN which may in turn use the information to notify a QoS level that it is able to support.

When an identifier intending to use a GBR or 5QI corresponding to the GBR is included in the PDU session establishment message received by the SMF from the UE, the SMF may deliver this when establishing policy association with the PCF. Upon receiving this, the PCF may identity information requested by the UE and information requested by the AF in operation 0, and based on this, may determine which GBR QoS flow is to be set up. Furthermore, the PCF may determine to configure a monitoring event for a QoS level among the information requested by the AF. After determining this, the PCF may deliver the monitoring event information for the QoS level to the SMF as part of the SM policy. At a later time, the SMF may deliver this to a BS.

When an identifier indicating that the PDU session requires QoS level monitoring is included in the PDU session establishment message received by the SMF from the UE, the SMF may deliver this when establishing policy association with the PCF. Upon receiving this, the PCF may identity information requested by the UE and information requested by the AF in operation 0, and based on this, may determine which QoS level monitoring function is to be set up. Furthermore, the PCF may determine that the UE supports the QoS level monitoring function. After this, the PCF may deliver the monitoring event information for a QoS level to the SMF as part of the SM policy. At a later time, the SMF may deliver this to a BS.

Furthermore, the SMF may identity subscription information of the UE and determine whether the UE is authorized to use a V2X service. When the UE is authorized to use the V2X service, the SMF may send a PCF an indicator that the UE is a V2X authorized UE when making a policy association with the PCF. Based on this, the PCF may determine whether to set up a QoS level monitoring function used for the V2X service for the UE. Alternatively, the PCF may obtain subscription information or policy information relating to whether the V2X service is available for the UE, and based on this, may determine whether to set up a QoS level monitoring function used for the V2X service for the UE.

In operation 4, the SMF may perform a unified power format (UPF) selection procedure, and perform an N4 session establishment procedure with a selected UPF. The SMF may deliver a packet detection, enforcement, and forwarding rule or the like to the UPF. Tunnel information used by the UPF for data transmission may be allocated by the SMF or by the UPF. This information may be exchanged between the SMF and the UPF in an N4 session establishment procedure.

In operation 5, the SMF may configure an N2 SM message to be sent to the BS based on session related policy information received from the PCF. This message may include information for delivering a profile of a QoS flow for a PDU session to the BS or for configuring the BS with monitoring event information for a QoS level. It may also include information for establishing a tunnel between the BS and the UPF. Furthermore, the SMF may configure a response (PDU session establishment accept) message to a PDU session establishment request for the UE based on the session related policy information received from the PCF. This message may include information about whether to authorize the QoS level monitoring function requested by the UE. The SMF may send the AMF the aforementioned message in a Namf_Communication_N1N2messageTransfer message. The N2 message may include a PDU session ID, a QoS profile, a QoS flow ID, tunnel information on the UPF side for N3 tunnel connection between the UPF and the BS, etc. The QoS profile may include information about the monitoring event for a QoS level. A content configuration of the N2 message according to an embodiment of the disclosure will be described with reference to a third embodiment.

The AMF may send acknowledgment (ACK) for Namf_Communication_N1N2messageTransfer to the SMF.

In operation 6, the AMF may forward the message received from the SMF to the BS. This message may include an N2 SM message received from the SMF, and may include an N1 SM NAS message received from the SMF.

In operation 7, the BS may receive the message of operation 6, and perform radio resource control (RRC) signaling for establishing a data radio bearer with the UE according to QoS information included in the N2 SM message. Furthermore, the BS may forward the received NAS message to the UE. The BS may receive information about whether the UE is authorized to use the V2X service from the AMF or the SMF. When the BS receives the aforementioned information and is authorized to use the V2X service, the BS may determine to apply a configuration of the received QoS level monitoring.

When a configuration of QoS level monitoring is included in the N2 SM message, the BS may store it in an access stratum context of the UE. This may later be used by the BS to send the PCF a notification about which QoS level may be supported according to a change in radio resource condition, a change in the number of UEs to be served, or a change of radio resource scheduling. This notification may be sent to the PCF via the SMF, and the PCF may change the QoS rule to suit the QoS level information that may be supported by the BS. Furthermore, the PCF may notify the AF of which QoS level is supported. Moreover, a configuration about QoS level monitoring stored in the access stratum context of the UE may also be sent to the target BS when the UE is handed over to another BS, so that the target BS may notify the PCF of information about a QoS level that the target BS is able to support.

In operation 8, the BS may send a response to operation 6. This message may include an N2 SM message, which may include a PDU session ID, and tunnel information on the BS side for N3 tunnel connection with the UPF. Furthermore, it may also include information about e.g., the established QoS flow. The information may include a notification about a QoS level that may be supported by the BS according to the QoS level monitoring event configured according to operation 7. This notification may be sent to the PCF through the SMF, and the PCF may determine that the BS is able to support the QoS level monitoring event. Alternatively, the BS may include an identifier indicating that the BS is able to support the monitoring event for a QoS level.

In operation 9, the AMF that has received the message of operation 8 may send the SMF the N2 SM message contained in the message of operation 8.

In operation 10, the SMF may identify the N2 SM message received in operation 9 and perform an N4 session modification procedure with the UPF. In this case, the SMF may forward the N3 tunnel information on the BS side received from the BS to the UPF and also a related packet forwarding rule. In this operation, the UPF and the BS may consider that tunnel connection is established for data transmission/reception. When the N2 SM message received from the AMF includes a notification about a QoS level that the BS is able to support, the SMF may forward this to the PCF. Alternatively, when an identifier indicating that the BS supports the monitoring event for a QoS level is included in the N2 SM message, the SMF may forward this to the PCF.

In operation 11, the SMF may send the AMF a response to operation 9.

Figure 2:
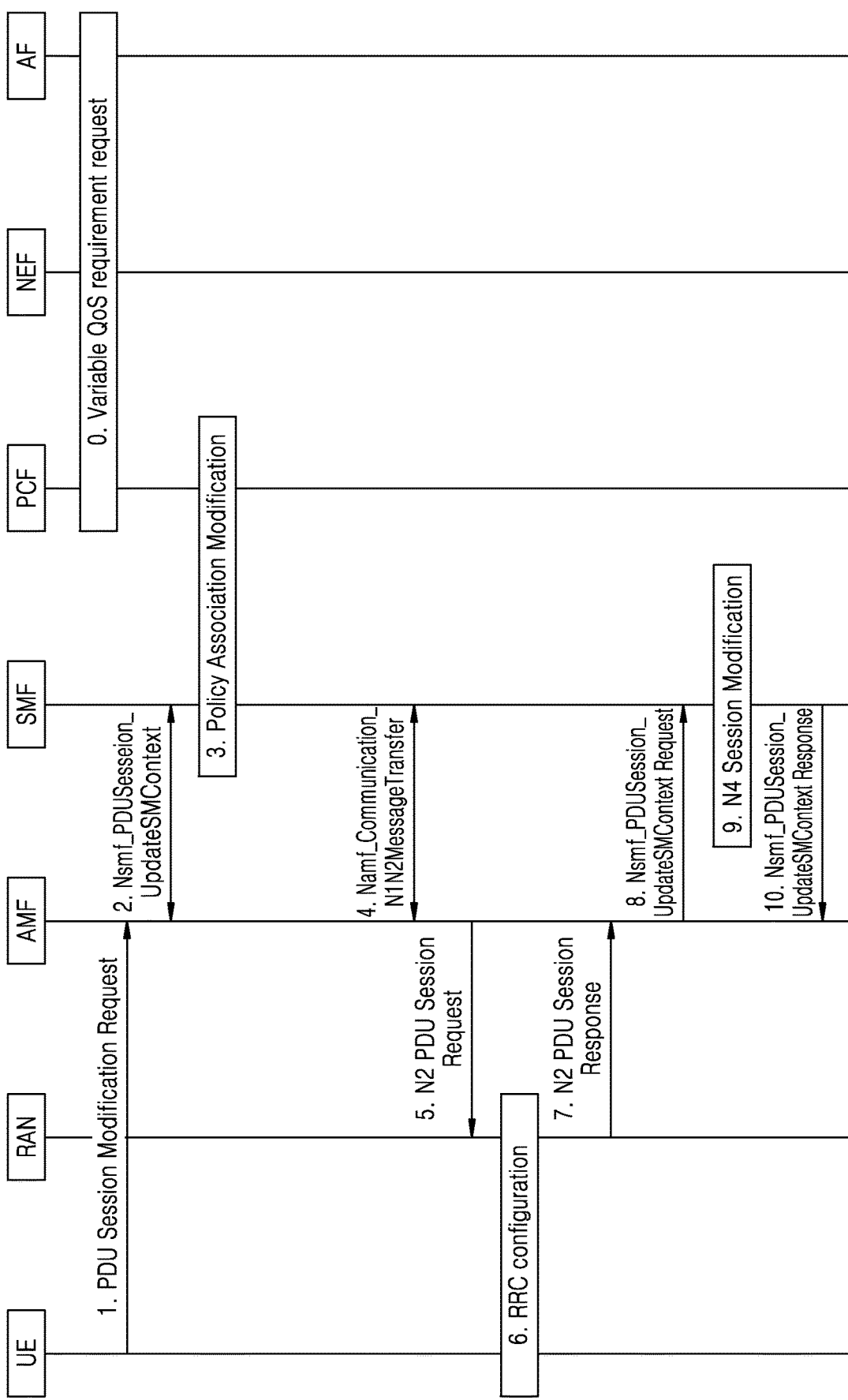
FIG. 2 is a diagram for describing a method of configuring a BS with a monitoring event for a QoS level during protocol data unit (PDU) session modification, according to an embodiment.

FIG. 2 is a diagram for describing a method of configuring a BS with a monitoring event for a QoS level during PDU session modification, according to an embodiment of the disclosure. A second embodiment may be described based on FIG. 2. In operation 0, an AF and a PCF may negotiate a QoS level required for a service that the AF provides to the UE. In this case, the AF and the PCF may negotiate using an ID of a particular UE, and the UE's ID may be mapped to a unique identifier of the UE used in the mobile communication network. Alternatively, the AF and the PCF may negotiate using an IP address of the particular UE, which is possible when the AF already knows the IP address of the UE that accesses the AF. The PCF knows the IP address of the UE, so the PCF may determine which UE the QoS level negotiation is for. Alternatively, the AF may be configured to apply all to a particular service without an ID of the particular UE, in which case the AF and the PCF may negotiate based on DNN or network slice information, or an application function ID. The QoS level may be a value determined by service level agreement between a mobile communication operator and a third service provider, and may be configured with a list. For example, values of QoS levels 1 to 10 may be defined and then QoS values (GBRs, maximum bitrates (MBRs), packet delay budgets (PDBs), and packet error rates (PERs)) corresponding to the levels may be defined in the network. Accordingly, the PCF may configure a QoS rule to be applied to the UE. For example, as for an AF for providing an autonomous driving service, the AF may set a QoS requirement depending on an autonomous driving level and send the QoS requirement to a PCF, which may in turn configure a corresponding QoS rule. In another example, as for an AF for providing an emergency management service, the AF may set a QoS requirement depending on a media format and send the QoS requirement to a PCF, which may in turn configure a corresponding QoS rule. In operation 0, the AF may configure the PCF to receive a notification about what QoS level is to be used by the UE, in addition to negotiation of a QoS level required to provide a service to the UE. As a result, the AF may receive a notification about a changed QoS level for the UE from the PCF and may change the QoS of the service provided for the UE based on the notification. For example, the AF may change an autonomous driving level, or may change a media format (a resolution, fps, etc.). When operation 0 occurs, the PCF may deliver a changed session related policy to an SMF that serves the UE corresponding to the request from the AF in operation 3. The changed session related policy may include a QoS rule according to the request from the AF or monitoring event configuration information for the QoS level.

In operation 1, to modify a PDU session, the UE may configure a PDU session modification request, which is an SM NAS message, and send it to an AMF. The UE may include a data network name (DNN) that the UE intends to use to the PDU session modification message, which may later be used when an SM or a PCF determines whether the DNN is authorized to apply the monitoring event for a QoS level. Furthermore, the UE may include an ID of an application server to be connected in a PDU session (or application function ID) in the PDU session modification message, which may later be used when a PCF determines whether the PDU session is authorized to apply the monitoring event for a QoS level. Moreover, the UE may include an identifier indicating that GBR establishment is wanted or 5QI (QoS indication used in the 5G) corresponding to the GBR in a PDU session modification request and then send the request. This may indicate that the UE intends to use the GBR for the PDU session. In another example, the UE may include an identifier indicating that the PDU session requires a function proposed in the disclosure, a QoS level monitoring function. An SMF that receives this information may deliver the aforementioned information to a PCF, and the information may be taken into account by the PCF to update session-related policy (policy association modification).

In operation 2, the AMF may select an SMF and deliver a Nsmf_PDUSession_CreateSMContext request message to the selected SMF. The AMF may put into this message, the PDU session modification request message received from the UE.

Operations 1 and 2 may not be performed, in which case, operation 3 may be performed following operation 0.

In operation 3, when operations 1 and 2 have been performed, the SMF may identity the PDU session modification request message received from the UE and perform an SM policy association modification procedure with the PCF for the corresponding DNN. In this case, the SMF may send the DNN or AF ID requested by the UE to the PCF. On receiving this, the PCF may configure and send a session related policy to be sent to the SMF. In this case, based on the information according to operation 0, when the PCF has a QoS level according to the request from the AF set for the PDU session used by the UE identified by a DNN or an AF ID, the PCF may configure a session related policy based on the information. For example, when there is a QoS level requiring a GBR QoS flow among QoS levels requested by the AF, the PCF may configure a QoS rule to include the GBR QoS flow among QoS flows to be established for the UE. Furthermore, the PCF may configure configuration information for QoS level monitoring according to the QoS level requested by the AF and include it in a session related policy. This information is later transferred to a RAN which in turn uses the information to notify a QoS level that it is able to support.

When an identifier intending to use a GBR or 5QI corresponding to the GBR is included in the PDU session modification message received by the SMF from the UE, the SMF may deliver this in a policy association modification procedure with the PCF. Upon receiving this, the PCF may identity information requested by the UE and information requested by the AF in operation 0, and based on this, may determine what GBR QoS flow is to be set up. Furthermore, the PCF may determine to configure a monitoring event for a QoS level among the information requested by the AF. After determining this, the PCF may deliver the monitoring event information for the QoS level to the SMF as part of the SM policy. At a later time, the SMF may deliver this to a BS.

When an identifier indicating that the PDU session requires QoS level monitoring is included in the PDU session modification message received by the SMF from the UE, the SMF may deliver this to the PCF in the policy association modification procedure with the PCF. Upon receiving this, the PCF may identity information requested by the UE and information requested by the AF in operation 0, and based on this, may determine which QoS level monitoring function is to be set up. Furthermore, the PCF may determine that the UE supports the QoS level monitoring function. After this, the PCF may deliver the monitoring event information for a QoS level to the SMF as part of the SM policy. At a later time, the SMF may deliver this to a BS in operations 4 and 5.

Even in a case that operations 1 and 2 have not been performed, operation 3 may be performed following operation 0. The PCF may update the session related policy for the SMF based on information negotiated with the AF according to operation 0. In this case, the PCF may deliver QoS level monitoring event configuration information according to operation 0 to the SMF. Alternatively, a QoS profile for a GBR QoS flow configured according to operation 0 may be delivered to the SMF.

In operation 4, the SMF may configure an N2 SM message to be sent to the BS based on session related policy information received from the PCF. This message may include information for delivering a profile of a QoS flow for a PDU session to the BS or for configuring the BS with monitoring event information for a QoS level. Furthermore, the SMF may configure a message requesting PDU session modification (PDU session modification command) for the UE based on the session related policy information received from the PCF. The SMF may send the AMF the aforementioned message in a Namf_Communication_N1N2messageTransfer message. The N2 message may include information about a PDU session ID, a QoS profile, a QoS flow ID, and a monitoring event for a QoS level. A detailed content configuration of the N2 message according to an embodiment of the disclosure will be described with reference to the third embodiment of the disclosure.

The AMF may send ACK for Namf_Communication_N1N2messageTransfer to the SMF.

In operation 5, the AMF may forward the message received from the SMF to the BS. This message may include an N2 SM message received from the SMF, and may include an N1 SM NAS message received from the SMF.

In operation 6, the BS may receive the message of operation 5, and perform an RRC signaling procedure for establishing a data radio bearer with the UE according to QoS information included in the N2 SM message. Furthermore, the BS may forward the received NAS message to the UE. When a configuration of QoS level monitoring is included in the N2 SM message, the BS may store it in an access stratum context of the UE. This may later be used by the BS to send the PCF a notification about which QoS level may be supported according to a change in radio resource condition, a change in the number of UEs to be served, or a change of radio resource scheduling. This notification may be sent to the PCF via the SMF, and the PCF may change the QoS rule to suit the QoS level information that may be supported by the BS and also notify the AF of which QoS level is to be supported. Moreover, a configuration about QoS level monitoring stored in the access stratum context of the UE may be sent to the target BS when the UE is handed over to another B S, so that the target BS may notify the PCF via the SMF of information about a QoS level that the target BS is able to support.

In operation 7, the BS may send a response to operation 5. This message may include the N2 SM message, which may even include information about a PDU session ID, an established QoS flow, etc. The information may include a notification about a QoS level that may be supported by the BS according to the QoS level monitoring event configured according to operation 6. This notification may be sent to the PCF through the SMF, and the PCF may determine that the BS is able to support the QoS level monitoring event. Alternatively, the BS may include an identifier indicating that the BS is able to support the monitoring event for a QoS level.

In operation 8, the AMF that has received the message of operation 7 may send the SMF the N2 SM message contained in the message of operation 8.

In operation 9, the SMF may identify the N2 SM message received in operation 8 and perform an N4 session modification procedure with the UPF. In this case, the SMF may forward the N3 tunnel information on the BS side received from the BS to the UPF and also a related packet forwarding rule. When the N2 SM message received from the AMF includes a notification about a QoS level that the BS is able to support, the SMF may forward this to the PCF. Alternatively, when an identifier indicating that the BS supports the monitoring event for a QoS level is included in the N2 SM message, the SMF may forward this to the PCF.

In operation 10, the SMF may send the AMF a response to operation 8.

Figure 3:
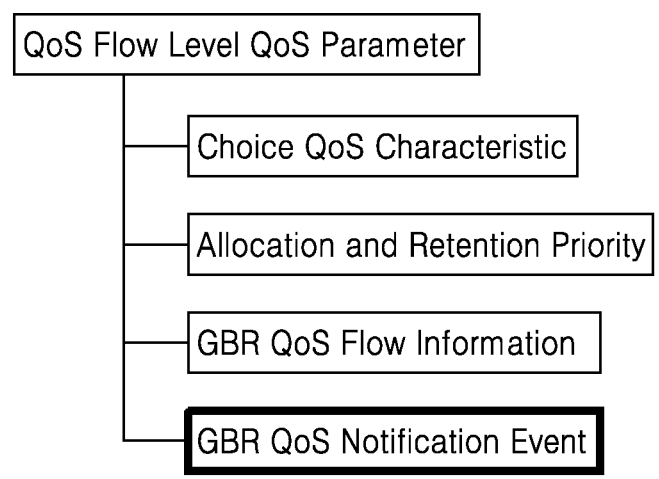
FIG. 3 is a diagram for describing monitoring configuration information for a QoS level configured for a BS, according to an embodiment.
Figure 4:
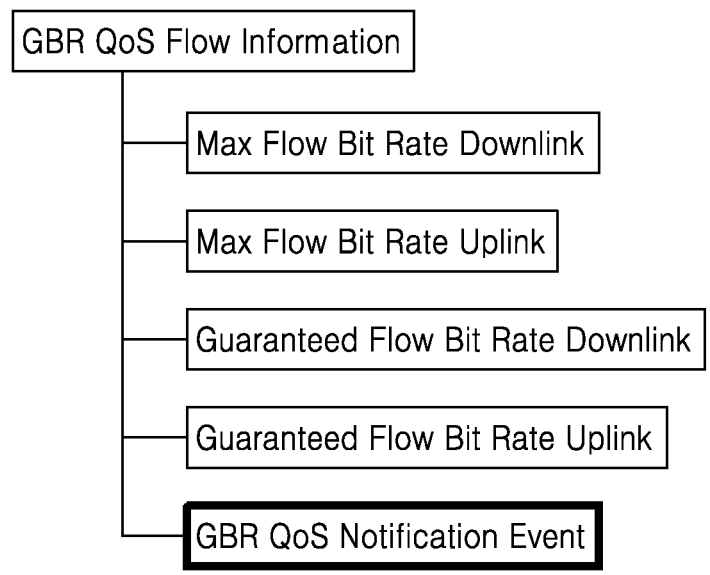
FIG. 4 is a diagram for describing monitoring configuration information for a QoS level configured for a BS, according to an embodiment.

FIG. 3 is a diagram for describing monitoring configuration information for a QoS level, according to an embodiment of the disclosure. FIG. 4 is a diagram for describing monitoring configuration information for a QoS level, according to an embodiment of the disclosure. A third embodiment may be described based on FIGS. 3 and 4. With reference to FIGS. 3 and 4, in what information type of a QoS level monitoring event set up by the PCF is configured for the BS according to an embodiment of the disclosure will now be described.

FIG. 3 illustrates an SMF configuring information about a QoS level monitoring event in a QoS flow level QoS parameter when configuring and sending a QoS profile to a BS, based on a QoS rule received from a PCF. The QoS flow level QoS parameter may be included in a PDU session resource setup request transfer message or a PDU session resource modify request transfer message. The QoS flow level QoS parameter may be configured with information as in FIG. 3. According to an embodiment of the disclosure, choice QoS characteristics indicating whether it is dynamic 5QI, an allocation and retention priority, GBR QoS flow information included when there is a GBR QoS flow, and a GBR QoS notification event corresponding to a QoS level monitoring event according to an embodiment of the disclosure may constitute the QoS flow level QoS parameter. The GBR QoS notification event is not limited to the name, but may have a different name that implies information configured by a PCF for a BS through an SMF to notify a QoS level that the BS is able to support. The GBR QoS notification event may be a profile called an alternative QoS profile and provided to determine values of QoS parameters that the BS is able to support. In an embodiment, the GBR QoS notification event may be comprised of the following information. The GBR QoS notification event may be configured with a list comprised of at least one element value among a downlink guaranteed flow bit rate, an uplink guaranteed flow bit rate, a downlink max packet loss rate, an uplink max packet loss rate, a downlink maximum packet delay budget, and an uplink maximum packet delay budget of the QoS flow. The BS may recognize a pair of the elements as a QoS level, and notify the SMF of values of the elements when they satisfy the corresponding QoS level. When a pair of the elements is configured with a list, there may be an index for the pair of the elements, and the index may be information allocated by the PCF and sent to the BS. In this case, the BS may notify the SMF of the corresponding index for a QoS level met by the BS. In another example, when the list of the element values are set to a GBR QoS notification event value, the BS may configure a notification message about the values of the respective elements and notify this to the SMF. Specifically, when only a downlink guaranteed flow bit rate (GFBR) may satisfy a particular value, the BS may send only the downlink GFBR value in a notification message. In another example, when a particular downlink/uplink GFBR and a maximum packet delay budget may be satisfied, the BS may send only values of the corresponding elements in a notification message. Alternatively, the BS may include all the values that may be currently supported for elements (QoS parameters) included in the GBR QoS notification event and send them all. For example, when even a PER and a PDR are included in a GBR QoS notification event and the BS determines that only a GFBR is able to support a low value as the network condition becomes bad, the BS may include not only the GFBR value but also the PER and PDB values that are currently supported in the notification message. Furthermore, a GBR QoS notification event may include a time window value required to calculate the PDB or PER. The time window may refer to a value indicating how long a measurement is made to calculate a delay or an error, which may be a value allocated by the PCF or a value received in a request from the AF.

FIG. 4 illustrates an SMF configuring information about a QoS level monitoring event in a GBR QoS flow information element in a QoS flow level QoS parameter when configuring and sending a QoS profile to a BS, based on a QoS rule received from a PCF. The QoS flow level QoS parameter may be included in a PDU session resource setup request transfer message or a PDU session resource modify request transfer message. GBR QoS flow information in the QoS flow level QoS parameter may be configured with information as in FIG. 4. In an embodiment of the disclosure, the GBR QoS flow information may include a downlink guaranteed flow bit rate, an uplink guaranteed flow bit rate, a downlink max packet loss rate, an uplink max packet loss rate of the GBR QoS flow, and GBR QoS notification event information according to an embodiment of the disclosure. The GBR QoS notification event is not limited to the name, but may have a different name that implies information configured by a PCF for a BS through an SMF to notify a QoS level that the BS is able to support. That is, it may refer to an information element for configuring a monitoring event for a QoS level proposed in the disclosure. In an embodiment, the GBR QoS notification event may be comprised of the following information. The GBR QoS notification event may be configured with a list comprised of at least one information value among a downlink guaranteed flow bit rate, an uplink guaranteed flow bit rate, a downlink max packet loss rate, an uplink max packet loss rate, a downlink maximum packet delay budget, and an uplink maximum packet delay budget of the QoS flow. The BS may recognize a pair of the elements as a QoS level, and notify the SMF of values of the elements when they satisfy the corresponding QoS level. When a combination of the elements is configured in a list, there may be an index for the combination of the elements, and the index may be information allocated by the PCF and sent to the BS. In this case, the BS may notify the SMF of the corresponding index for a QoS level met by the BS. In another example, when the list of the element values are set to a GBR QoS notification event value, the BS may configure a notification message about the values of the respective elements and notify this to the SMF. Specifically, when only a downlink GFBR may satisfy a particular value, the BS may send only the downlink GFBR value in a notification message. In another example, when a particular downlink/uplink GFBR and a maximum packet delay budget may be satisfied, the BS may send only the values of the corresponding elements in a notification message. Furthermore, a GBR QoS notification event may include a time window value required to calculate the PDB or PER. The time window may refer to a value indicating how long a measurement is made to calculate a delay or an error, which may be a value allocated by the PCF or a value received in a request from the AF.

Based on information contained in the GBR QoS notification event described in FIG. 3 or 4, when the BS is able to support a value of an element in the information, the BS may determine to perform an operation of sending the corresponding QoS level notification to the SMF. The QoS level notification may be sent to the SMF, which may in turn forward it to a PCF. Based on this, the PCF may newly generate a GBR QoS flow for the UE or change the existing QoS flow, and notify a result of the change to the AF. When determining QoS level information that the BS is able to support, the BS may determine a value that may satisfy at least a set QoS level among a QoS value of a level that may be supported by the BS and a value set for QoS level monitoring. For example, when the GFBR that the BS is able to support is 100 and there are 80, 90 and 110 for the GFBR set for QoS level monitoring, the BS may send the notification of QoS level information indicating that it may support GFBR 90. Furthermore, when the GFBR that the BS is able to support is later changed to 110, the BS may send the notification of QoS level information indicating that it may support GFBR 110. Accordingly, in an embodiment of the disclosure, the BS may notify the QoS level even when the QoS level goes down and even when the QoS level goes up. Furthermore, in an embodiment of the disclosure, when the BS is able to support QoS level information set to any of a GFBR, a PER, and a PDB, the BS may send the QoS level information in a notification message. Moreover, in an embodiment of the disclosure, when the GFBR, the PER, and the PDB are configured in a set, the BS may search the set QoS level information for a value that satisfies all the GFBR, PER, and PDB that the BS is able to support, and may send the corresponding QoS level value in a notification message. When the GFBR, the PER, and the PDB are configured in a set and there is an index for the set, the BS may send only the index in the notification message.

Furthermore, the BS may send GBR QoS notification event information described in FIG. 3 or FIG. 4 to a target BS during handover, and based on this information, the target BS may send the SMF a notification according to a QoS level that the BS is able to support.

As the PCF has configured a GBR QoS flow and additionally configured a QoS level monitoring event for the BS, the PCF may determine that a QoS level notification about the set GBR QoS flow is to be sent. When no QoS level notification is received from a BS, the SMF or the PCF may determine that the BS does not support the QoS level monitoring event function. With the aforementioned operations, the PCF may determine whether the BS supports the QoS level monitoring event function. When handover between BSs occurs, the SMF or the PCF receives information about a changed cell ID or BS ID, and in this case, when a QoS level notification is not sent, may determine that the BS does not support the QoS level monitoring event function.

Figure 5:
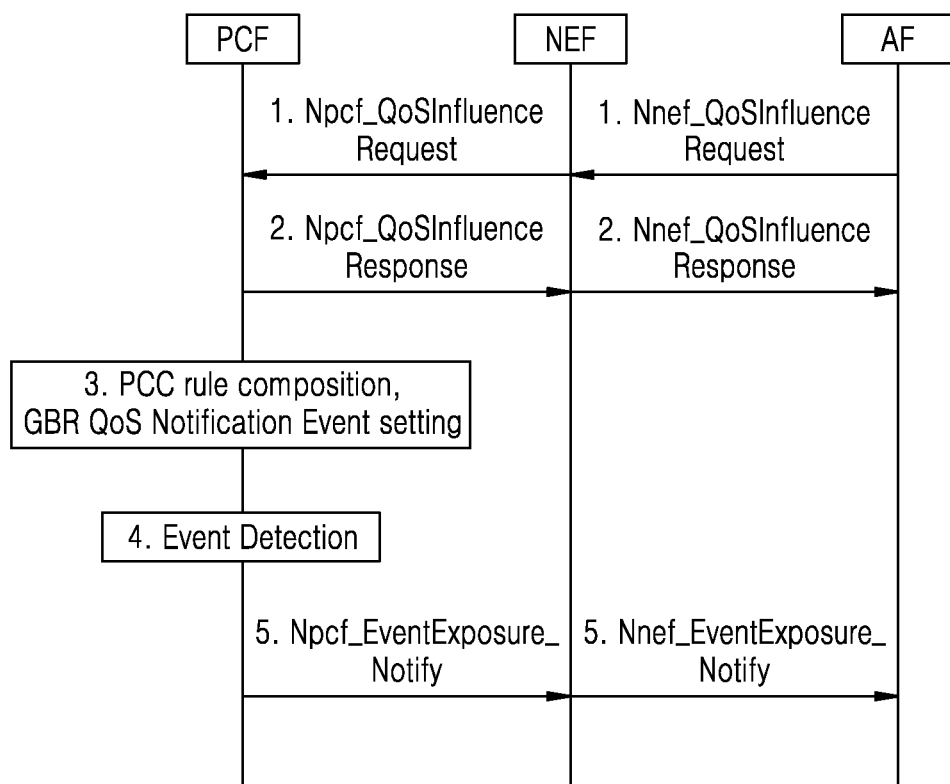
FIG. 5 is a diagram for describing a method of an application function performing negotiation and event configuration for a QoS level, according to an embodiment.

FIG. 5 is a diagram for describing a method by which an AF and a PCF perform negotiation on a requirement for a QoS level and a QoS level monitoring event function, according to an embodiment of the disclosure. A fourth embodiment may be described based on FIG. 5.

In operation 1, an AF may send a requirement for a QoS level to be provided for a particular UE, a particular DNN, or a particular PDU session to a network exposure function (NEF) or a PCF. To indicate the particular UE, the AF may designate an external ID or a GPSI for the UE. To indicate the particular DNN, the AF may include a DNN value in a request message. To indicate the particular PDU session, the AF may include an IP address of the UE or an AF ID for a PDU session established by the UE in a request message. The request message may include at least one of the aforementioned identifiers, and may be sent to the PCF to be used to identify the UE or the PDU session. Furthermore, the AF may add its address to receive a response, and may add an identifier to receive a notification caused by the corresponding request. The AF may add, to a request message, network slice information or service information (e.g., a V2X service) that the AF provides.

The AF may request, from a PCF, a QoS level set in advance by service level agreement (SLA) with a mobile communication operator. For example, when the QoS levels 1 to 10 have already been agreed to be used, the AF may request to use the QoS levels 1 to 5 in the corresponding request. When the AF has been agreed by the SLA to be able to request a particular GFBR, packet delay budget (PDB), and packet error rate (PER), the AF may specify and add the GFBR, PDB, and PER for a QoS level that the AF wants to the request message. For example, the AF may configure an index indicating level 1 and a corresponding downlink/uplink GFBR value, downlink/uplink PDB value, and downlink/uplink PER value in a list and send the request. Furthermore, the AF may also send a time window value required to calculate the PDB or PER. The time window may refer to a value indicating how long a measurement is made to calculate a delay or an error, and this information may be sent to the BS.

When requesting a requirement for a QoS level from a PCF, the AF may add information about an area to which a notification service about a change in QoS level is to be applied. When requesting from the PCF a requirement for QoS levels about which the AF wants to receive a notification, the AF may add information about an area in which the corresponding function is to be usefully used. For example, as for a suburban area with an uncrowded network, a QoS level is less likely to be changed depending on the network condition, so the AF may not need to send a requirement for QoS levels to the PCF and receive a notification about a changed QoS level. The AF may determine to receive a notification about a changed QoS level for an urban area or a particular path to use it for a V2X service. Furthermore, a mobile communication operator may not support the GBR QS notification event function in all areas in which the operator provides mobile communication services. This function is to be supported by the BS, but some BSs in some areas may not support the function, or the mobile communication operator may not configure the GBR QoS notification event function to be supported in all areas that provide the service. Accordingly, when the AF requests a service to receive a notification about a changed QoS level and sends information about an area that requires the service in the request, the mobile communication operator may determine the information about an area, to which the service may be provided, according to its deployment configuration. For example, for a requested area, a BS configuration may be changed to support the GBR QoS notification event function, or for an area for which the GBR QoS notification event function may not be supported, a response indicating that the GBR QoS notification event function may not be supported may be given to the AF. In this case, a notification function for a changed QoS level is not operated in the corresponding area, so the AF may take this into account to provide a V2X service.

For such an operation, when delivering a requirement for QoS levels to a PCF, the AF may configure information about an area in which the AF wants to receive the service and have the configured information also included in a message delivering the requirement for QoS levels. The area information may be configured with a list of cell IDs or tracking area IDs, or comprised of a geographical area (e.g., a range of GPS information or a GPS information list) or a civic address (street number, zip code, and building number, etc.). When the NEF forwards this area information sent from the AF to the PCF, the NEF may map the area information to area information that may be understood by the mobile communication operator, i.e., a cell ID or a tracking area ID. Furthermore, a list of the mapped cell ID or tracking area ID may replace the area information sent by the AF and may be delivered in a request message to the PCF. When receiving the request with the list of the geographical area (e.g., a range of GPS information or a GPS information list) or the civic address (street number, zip code, and building number, etc.) from the AF, the PCF may map this to area information that may be understood by the mobile communication operator, i.e., a cell Id or a tracking area ID. Furthermore, it may be determined based on the mapped information in which area the notification about a change in QoS level may be supported or not. Alternatively, when receiving a list of cell IDs or a list of tracking area IDs from the AF, the PCF may determine whether it is able to support notification about a change in QoS level for the area information. The PCF may have been configured through OAM about which area the GBR QoS notification event is supported for. Accordingly, the PCF may determine whether the area is supported with the notification about a change in QoS level. When the PCF determines that the notification about a change in QoS level may be supported for the requested area information, the PCF may send ACK to the AF in response. When some areas in the requested area information may not be supported with the notification about a change in QoS level, a list of the area information (e.g., GPS information, a GPS range, or civic addresses) may be configured and sent in a response to the AF. When there is only one area that may not be supported, the list may not be configured. Alternatively, the PCF may configure a list of information about areas that may be supported (e.g., GPS information, a GPS range, or civic addresses) and send the list in a response to the AF. Upon receiving this, the AF may determine which area the notification about a change in QoS level is supported for, and accordingly, may determine how to apply the QoS change when the UE moves into the corresponding area. For example, as the notification about a change in QoS level is not supported for the corresponding area, the AF may determine to provide the UE with an autonomous driving service that suits a normal network condition, e.g., autonomous driving level 2, and operate accordingly.

The AF may perform PCF discovery to send the request. The AF may perform a network function or use a preset PCF address for the PCF discovery. In a case of going through an NEF, the AF may perform NEF discovery and obtain an address of the NEF by performing a network function that manages an API provided by the NEF. Alternatively, the AF may use a preset NEF address.

Although the aforementioned request is referred to as a QoS influence request for convenience of explanation in the disclosure, a different name that implies an operation of the AF providing the PCF with information about a QoS level wanted by the AF may be included.

Upon receiving the message in operation 1, the PCF may perform an authentication/authorization procedure based on a DNN, an AF ID, network slice information, a UE ID, or an ID of a service provided by the AF (e.g., a V2X service) included in the message of operation 1 in order to determine whether the AF is able to send the QoS influence request. The PCF may also identity the identifier of the UE included in the request sent by the AF to determine whether the UE is a UE for which the QoS influence request of the AF may be applied. For example, after determining that the AF sent the QoS influence request for a V2X service, the PCF may determine through subscriber information or policy information whether the UE corresponding to the request of the AF may use the V2X service. After performing authentication/authorization on the QoS influence request of the AF, the PCF may send a response to operation 1 in operation 2. When the message of operation 1 is received through an NEF, the response may be sent through the NEF. When the message of operation 1 arrives directly from the AF, the PCF may send the response directly to the AF. The PCF may allocate an identifier (e.g., reference ID) for the QoS influence request and include the identifier in the response of operation 2. This may be used later to identify a corresponding request when sending a notification about a change in QoS level in a case that the QoS level provided to the UE is changed. The PCF may send in response a QoS level information determined to provide from among pieces of information about a QoS level requested by the AF. For example, the AF may request QoS levels 1 to 10, but the PCF may determine to use levels 1, 3, 5, 7, and 9 only. In this case, the PCF may include an identifier about the levels 1, 3, 5, 7, and 9 in a response message. In another example, for the QoS level information requested by the AF, GFBR, PDB, and PER values determined by the PCF to be provided may be determined and included in the response message. On receiving this, the AF may determine which QoS level is to be used, and may determine which level of the GFBR, PDB or PER value is used when receiving a notification about a changed QoS level later from the PCF. When it is determined that the UE does not support the QoS level monitoring function according to FIG. 1, the PCF may send a failure response to the request from the AF. When it is determined that the BS does not support the QoS level monitoring function according to FIG. 1 or 2, the failure response may not be sent but it may be processed as a successful request because a shift to a BS that supports the QoS level monitoring function may be made depending on the UE's mobility.

In operation 3, the PCF may configure a policy rule to be applied to a corresponding UE or corresponding PDU session. The rule may include an event setting that requests to monitor a QoS level that may be supported from the BS in order to apply a QoS level according to the request of the AF. The PCF may configure a QoS level monitoring event value with QoS levels according to the request of the AF or a preset value. The value may be comprised of a GFBR, a PDB, or a PER, or may have the form of a list comprised of a set including at least one of the GFBR, the PDB, or the PER. Alternatively, it may be comprised of element values including at least one of the GFBR, the PDB, or the PER. The QoS level monitoring event set in this way may be sent to the BS through an SMF, which may follow the embodiment as described in connection with FIG. 2.

In operation 4, when the BS sent a notification according to the QoS level monitoring event, the PCF may receive this and determine what QoS level may be supported. Upon receiving a notification about at least one element of the GFBR, the PDB, or the PER according to the QoS level that may be currently supported by the BS, the PCF may notify a change in QoS rule based on the notification to the BS and then UE through the SMF. After this, the PCF may send QoS level information about a QoS flow currently used by the UE according to the changed QoS level to an AF in operation 5. The message of operation 5 may include an index of a QoS level negotiated by the AF in operations 1 and 2, or may include an applied value of at least one of the GGBR, the PER, or the PDB of the QoS flow applied to the UE.

In operations 1 and 2, a message may be sent between the AF and the PCF through an NEF. This may correspond to a case that the AF is unable to directly access the PCF and thus uses a corresponding service through the NEF. The NEF may discover a PCF that serves the UE or the DNN based on the request received from the AF. In this case, the NEF may map an external ID of the UE received from the AF to an internal ID, a subscription permanent identifier (SUPI), and use the SUPI to discover a serving PCF. Alternatively, the NEF may discover a PCF that serves a UE when receiving an IP address of the UE from the AF. Having discovered the PCF, the NEF may forward the request sent by the AF to the PCF. The NEF may store information about the AF that sent the request as well as an identifier about the request sent by the AF. This may be matched with an identifier about a request forwarded by the NEF to the PCF, and the NEF may also store the identifier about the request forwarded by the NEF to the PCF. When receiving a response from the PCF, the NEF may identify which AF's request has caused the response and send the response of operation 2 to the corresponding AF.

In operation 5, a message may be sent between the AF and the PCF through the NEF. As the NEF stores information about an AF that has requested QoS level monitoring in operations 1 and 2, upon receiving a notification from the PCF, the NEF may identify an AF to receive based on an identifier included in the notification. The NEF may then forward the notification received from the PCF to the AF.

In an embodiment of the disclosure, the AF may revoke the existing request through operation 1. The revocation may refer to an operation of withdrawing the existing request for the QoS level negotiated, or an operation of withdrawing the request for the QoS level monitoring function. Upon receiving this, the PCF may notify that the existing request has been revoked through operation 2. The PCF may need to reconfigure the PCC rule according to operation 3 because the existing request of the AF has been revoked. Hence, the PCF may delete information about the existing QoS level negotiated with the AF from the policy context. Accordingly, the related QoS rule may be modified. Furthermore, the PCF may perform an operation of releasing the establishment of QoS level monitoring. The PCF may configure an indication that a QoS level monitoring configuration value will be emptied (i.e., filled to be null) or the establishment of the QoS level monitoring is revoked, and send the configuration in the PCC rule to an SMF. When the SMF checks out the received PCC rule and finds the QoS level monitoring configuration value empty (i.e., filled to be null) or finds that an indication that the QoS level monitoring configuration is revoked is included, the SMF may reflect this in a QoS profile for the UE. After determining that the QoS level monitoring configuration has been revoked, the SMF may need to notify a BS that the configuration has been revoked. For this, the SMF may include an indication that the QoS level monitoring configuration will be revoked in the QoS profile or a QoS parameter, or may leave the QoS level monitoring configuration value empty (i.e., filled to be null), and may deliver this to the BS. When the BS receives this and finds the QoS level monitoring configuration value empty (i.e., filled to be null) or finds that an indication that the QoS level monitoring configuration is revoked is included, the BS may reflect this in a context of the UE and stop the QoS level monitoring operation.

Figure 6:
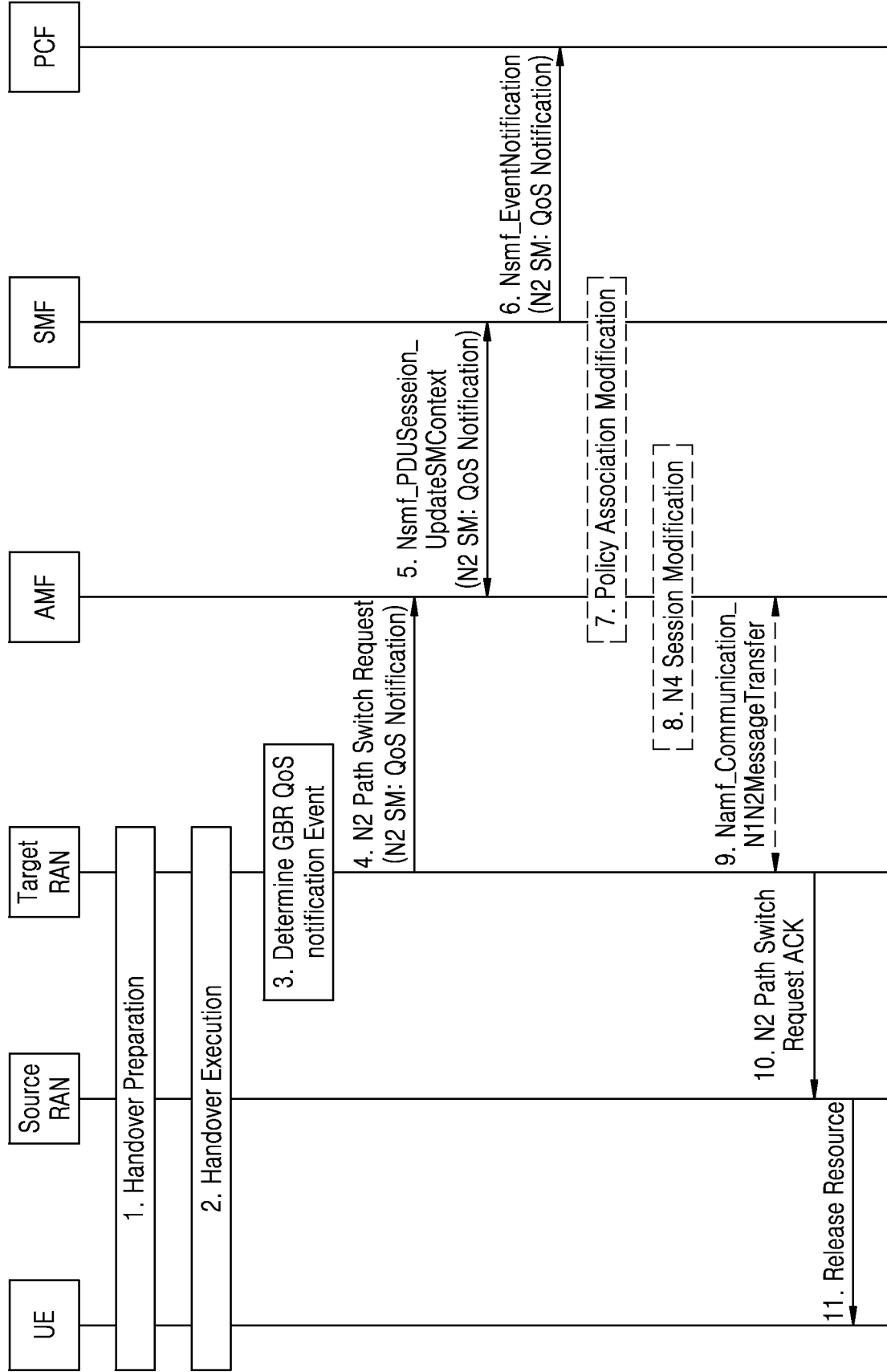
FIG. 6 is a diagram for describing a method of a target BS performing notification of a QoS level along with a handover procedure, according to an embodiment.

FIG. 6 is a diagram for describing a method of a target BS performing notification of a QoS level along with a handover procedure, according to an embodiment of the disclosure. A fifth embodiment may be described based on FIG. 6. In operation 1, a source BS that is serving a UE may prepare handover. To determine a target BS with which the handover is performed, the source BS may identity a measurement report received from the UE and obtain candidates of the target BS having good signal intensity. The source BS may send the candidate BSs information about a QoS flow that the source BS currently supports and GBR QoS notification event (i.e., alternative QoS profile) information. Upon receiving them, the candidates BSs may each send information about a QoS flow that it is able to support to the source BS. For example, when a candidate BS is able to support a QoS parameter of a QoS flow that the source BS currently supports, the candidate BS may respond that it is able to support the QoS flow. When a candidate BS is unable to support the QoS parameter of the QoS flow that the source BS currently supports, the candidate BS checks out the received GBR QoS notification event (i.e., alternative QoS profile) information, determine whether there is a QoS parameter that it is able to support, and sends the related information to the source BS. When there are several QoS parameters in the GBR QoS notification event information that the candidate BS is able to support, the candidate BS may select an index of a QoS profile or a QoS value corresponding to a QoS parameter with a highest value, and send it to the source BS. When the source BS receives them from the candidate BSs, the source BS may select a candidate BS that may provide the best service (i.e., that may apply the best QoS) as the target BS by comparing, overall, signal intensities between each BS and the UE and QoS parameters that the BS is able to support or QoS parameters corresponding to the QoS profile index. For example, when there is a candidate BS that is able to support a better QoS value (a value about a QoS profile or QoS parameter included in the GBR QoS notification event) than a QoS parameter for a QoS flow that the source BS currently supports, the source BS may select the candidate BS as the target BS. With this procedure, the source BS may determine the target BS and send an access stratum context of the UE, RRC information currently used by the UE, and data radio bearer (DRB) information to the target BS. The target BS may notify the source BS that it is prepared to perform handover, and also notify the source BS of RRC information required for the UE to access the target BS. In an embodiment of the disclosure, the access stratum context may include a QoS level monitoring configuration value.

In operation 2, the source BS serving the UE may issue a command to handover the UE to the target BS based on the information received from the target BS, and accordingly the UE is able to access the target BS. With this, the UE may successfully access the target BS and keep using data transmission and reception based on a DRB allocated by the target BS.

In operation 3, the target BS may identity an access stratum context of the UE that the target BS starts to serve, and determine whether a QoS level monitoring event for a QoS flow used by the UE is configured in the context according to an embodiment of the disclosure. The target BS may identity QoS information in the context of the UE received from the source BS, and when a GBR QoS notification event according to an embodiment of the disclosure is configured in the QoS information, may perform an operation for the event. Alternatively, the target BS may select QoS that may be applied to the UE to be a piece of the GBR QoS notification event information, and then notify an SMF of the selected QoS information. In the handover preparation procedure, the target BS may have determined QoS information that may be applied to the UE based on the GBR QoS notification event information received from the source BS. Alternatively, after performing handover, it may identity the QoS information to be supported for the UE again and then determine to notify this. In other words, the target BS may determine QoS level information or a GFBR, a PER, or a PDB that the target BS is able to provide, based on the GBR QoS notification event value, and then notify this.

In operation 4, when the target BS having determined to send a notification about the QoS level information in operation 3 sends an AMF a path switch request message indicating that the target BS will serve the UE, the notification about the QoS level information may be included in an N2 SM message of the path switching message.

After receiving the message in operation 4, the AMF may forward the N2 SM message received from the BS to an SMF in operation 5.

In operation 6, the SMF may forward the QoS notification information received from the BS to a PCF.

In operation 7, the PCF may determine the QoS level information notified that the BS is able to support, and then change the QoS flow of a PDU session currently used by the UE or send an updated QoS rule to the SMF to apply a new GBR QoS flow. Alternatively, the PCF may update the QoS level monitoring configuration value and include the updated value in the QoS rule.

In operation 8, the SMF may perform an N4 session modification procedure with an UPF based on the QoS rule received in operation 7.

In operation 9, the SMF may configure a QoS profile based on the QoS rule received in operation 7 and send the message to the AMF to send an N2 SM message to the BS. The AMF may transmit ACK for this message to the SMF.

In operation 10, the AMF may send the N2 SM message received from the SMF in operation 9 in a response message to operation 4. Upon receiving this, the target BS may reconfigure a DRB of the UE to suit the newly received QoS information. When QoS level monitoring is configured in the received QoS information, the target BS may take this into account to monitor a QoS level or GFBR, PDB, or PER that may be provided for the UE.

After operation 10, the target BS may send the source BS signaling that an existing resource having been provided for the UE is allowed to be released in operation 11.

In a sub-embodiment of this embodiment, N2 based handover, i.e., handover performed when the AMF serves as an anchor instead of the inter-BS handover may follow the following operations. After the UE is handed over and completes connection to the target BS, when a GBR QoS notification event according to an embodiment of the disclosure is configured in the QoS information included in the context of the UE, the target BS may perform an operation for the event. In other words, the target BS may determine QoS level information or a GFBR, a PER, or a PDB that the target BS is able to provide, based on the GBR QoS notification event value, and then send a notification about this. The target BS may include this notification in an N2 SM message when the target BS notifies that handover is completed by sending a handover notify message to the AMF according to a sub-embodiment of the disclosure. Upon receiving this message, the AMF may forward this to the SMF and the SMF may perform operation according to operation 6.

As handover is repeated, the following problem may arise. In a case that a first BS supports the GBR QoS notification event while a second BS does not support the GBR QoS notification event, when the UE is handed over from the first BS to the second BS, the second BS may not identify information about the GBR QoS notification event because the second BS does not support the GBR QoS notification event. Hence, the GBR QoS notification event information is not stored in the UE context. Accordingly, the GBR QoS notification event is not applied while the UE stays under the second BS. When the UE is handed over from the second BS to a third BS, the third BS may support the GBR QoS notification event function. However, the second BS has not included the GBR QoS notification event information in the UE context, so the GBR QoS notification event information may not be delivered to the third BS, according to which, even though the UE is handed over to the third BS that is able to support the GBR QoS notification event function, the UE is unable to use the GBR QoS notification event function. To solve this problem, the BS may perform the following operation. When the BS supports the GBR QoS notification event function, the BS may include information indicating that it supports processing of the GBR QoS notification event, i.e., alternative QoS profile, e.g., an additional identifier, in the first N2 SM information to be transmitted to the SMF. Accordingly, the SMF may determine that the BS supports the GBR QoS notification function. When the BS does not support the GBR QoS notification event function, the BS is operated to include no additional information, and accordingly, the SMF may determine that the BS does not support the GBR QoS notification event function. The first N2 SM information to be transmitted by the BS to the SMF may be included in an NGAP path switch or NGAP handover notify message after handover is performed. Alternatively, it may be included in an NGAP initial context setup response message. The BS may include this information in an N2 SM information message sent for the first time after the BS starts to serve the UE.

Upon receiving this, the SMF may perform the following operation. The SMF may identity N2 SM information received as a result of handover (i.e., N2 SM information included in an NGAP path switch delivered from the BS to the AMF or in an NGAP handover notify message received by the SMF from the AMF), and check whether the corresponding information includes an identifier indicating that the GBR QoS notification event function may be supported to determine whether the BS is able to support the GBR QoS notification event function. Alternatively, the SMF may receive the N2 SM information received by the AMF in an NGAP initial context setup response message, check whether the information includes an identifier indicating that the GBR QoS notification event function may be supported, and determine whether the BS is able to support the GBR QoS notification event function. After receiving this information once, the SMF may determine that the BS continues to support the GBR QoS notification event function until the BS serving the UE is changed. Specifically, even when the identifier indicating that the GBR QoS notification event function may be supported is not included in the N2 SM information in a subsequent operation, but when the BS had previously notified that it supports the GBR QoS notification event function, it may be determined that the BS supports the GBR QoS notification event function.

The SMF may determine according to the aforementioned operation whether the BS currently serving the UE supports the GBR QoS notification event (e.g., alternative QoS profile handling). When the BS transmits the N2 SM information without including information indicating that the BS newly serving the UE supports the GBR QoS notification event, the SMF determines that the UE is being served from a BS that does not support the GBR QoS notification event function. Accordingly, as the GBR QoS notification event function is not supported, the SMF may send a notification about this to the PCF. Specifically, a notification that the GBR QoS notification event function, i.e., an alternative QoS profile handling function, is disabled may be sent to the PCF. Upon receiving this, the PCF may determine that the UE is currently present in an area where the GBR QoS notification event function is not supported, and may notify the AF that the notification service about a change in QoS level requested by the AF (i.e., corresponding to the GBR QoS notification event function) is not currently supported. Upon receiving this, the AF may determine that the QoS level change notification is not supported and change the service for the UE. For example, it may provide a same level service to the UE for which the function is not supported, or may lower the level of the autonomous driving service because it is unable to know the network condition.

When receiving the N2 SM information including information indicating that the previous BS has not supported the GBR QoS notification event function but the BS newly serving the UE supports the GBR QoS notification event, the SMF determines that the UE is being served from the BS that supports the GBR QoS notification event function. Furthermore, the SMF may determine that the new BS may not have received the GBR QoS notification event information from the previous BS. Hence, the SMF may determine to send the new BS the GBR QoS notification event information, i.e., an alternative QoS profile, and then configure this into an N2 SM message to be sent to the BS. Upon receiving this, the BS may provide this function according to the GBR QoS notification event information included in the N2 SM message. Furthermore, as the GBR QoS notification event function is supported again, the SMF may send a notification about this to the PCF. Specifically, a notification that the GBR QoS notification event function, i.e., an alternative QoS profile handling function, is enabled again may be sent to the PCF. This operation may be performed only when 'disabled' was notified before. Upon receiving this, the PCF may determine that the UE is currently present in an area where the GBR QoS notification event function is supported, and may notify the AF that the notification service about a change in QoS level requested by the AF (i.e., corresponding to the GBR QoS notification event function) is currently supported again. This operation may be performed only when 'disabled' was notified before. Upon receiving this, the AF may determine that the QoS level change notification is supported and change the service for the UE. For example, it may change a level of the autonomous driving service to a higher or lower level that suits the current QoS level.

Figure 7:
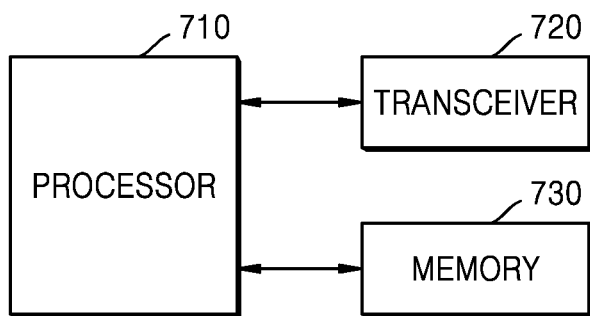
FIG. 7 is a block diagram illustrating an internal structure of a use equipment, according to an embodiment.

FIG. 7 is a block diagram illustrating a structure of a UE, according to an embodiment.

Referring to FIG. 7, the UE may include a processor 710, a transceiver 720, and a memory 730. The processor 710, the transceiver 720, and the memory 730 of the UE may operate according to the aforementioned communication method of the UE. Components of the UE are not, however, limited thereto. For example, the UE may include more or fewer elements than described above. In addition, the processor 710, the transceiver 720, and the memory 730 may be implemented in a single chip.

The processor 720 may control a series of processes for the UE to be operated according to the embodiments of the disclosure. For example, it may control signal flows between the respective blocks to perform operation according to embodiments of the disclosure.

The transceiver 720 may transmit or receive signals to or from another network entity. The transceiver 720 may, for example, receive system information from a BS and receive a sync signal or a reference signal. For this, the transceiver 720 may include an RF transmitter for up-converting the frequency of a signal to be transmitted and amplifying the signal and an RF receiver for low-noise amplifying a received signal and down-converting the frequency of the received signal. It is merely an example of the transceiver 720, and the elements of the transceiver 720 are not limited to the RF transmitter and RF receiver.

The memory 730 may store at least one of information received or for transmission through the transceiver 710 and information generated by the processor 710. The memory 730 may store a program and data required for operation of the BS. Furthermore, the memory 730 may store control information or data included in a signal obtained by the UE. The memory 730 may include a storage medium such as a read only memory (ROM), a random access memory (RAM), a hard disk, a compact disc ROM (CD-ROM), and a digital versatile disk (DVD), or a combination of storage mediums. Moreover, the memory 730 may be in the plural. In an embodiment of the disclosure, the memory 730 may store a program to support beam based cooperative communication.

Figure 8:
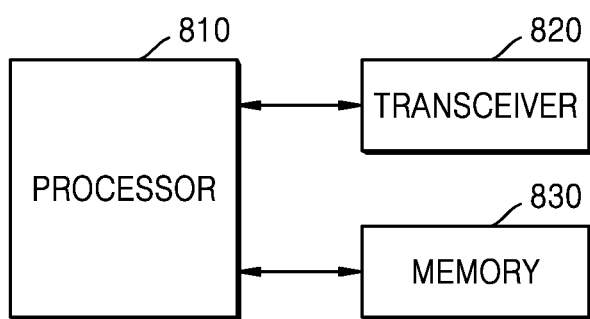
FIG. 8 is a block diagram illustrating configuration of an entity, according to an embodiment.

FIG. 8 is a block diagram illustrating a structure of an entity, according to an embodiment.

Referring to FIG. 8, the entity may include a processor 810, a transceiver 820, and a memory 830. In the disclosure, the processor 810 may be defined to be a circuit, an ASIC, or at least one processor. Components of the entity are not, however, limited thereto. For example, the entity may include more or fewer elements than described above. In addition, the processor 810, the transceiver 820, and the memory 830 may be implemented in a single chip.

The processor 810 may control general operation of a BS according to embodiments of the disclosure. For example, the processor 810 may control signal flows among the respective blocks to perform operation as described above with reference to the aforementioned drawings.

The transceiver 820 may transmit or receive signals to or from another network entity. The transceiver 820 may, for example, transmit system information to a UE and transmit a sync signal or a reference signal.

The memory 830 may store at least one of information received or for transmission through the transceiver 820 and information generated by the processor 810. Furthermore, the memory 1830 may store control information or data included in a signal obtained by the BS. The memory 830 may include a storage medium such as a ROM, a RAM, a hard disk, a CD-ROM, and a DVD, or a combination of storage mediums. Moreover, the memory 830 may be in the plural. In an embodiment of the disclosure, the memory 830 may store a program to support beam based cooperative communication.

Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes. Furthermore, the embodiments may be operated by being combined with one another if necessary. For example, part of an embodiment of the disclosure and part of another embodiment of the disclosure may be combined to operate the BS and the UE. Although the embodiments of the disclosure are proposed based on a frequency division duplex (FDD) LTE system, modifications to the embodiments of the disclosure, which do not deviate from the scope of the disclosure, may be applicable to other systems such as a time division duplex (TDD) LTE system, a 5G or NR system, or the like.

The invention claimed is:

1. An operating method of a target base station (BS) in a mobile communication system, the method comprising:
receiving, from a source BS, alternative quality of service (QoS) profile (AQP) information;
determining whether information matching QoS information allowed to be supported for a user equipment (UE) to be served is included in the AQP information; and
when the information matching the QoS information allowed to be supported for the UE to be served is included in the AQP information, transmitting the matching information to an access and mobility management function (AMF).

2. The method of claim 1, wherein the determining of whether the information matching the QoS information allowed to be supported for the UE to be served is included in the AQP information comprises determining whether there is, in the AQP information, information matching at least one of a guaranteed flow bit rate (GFBR), a packet error rate (PER) or a packet delay budget (PDB) for the target BS to be able to support the UE to be served.

3. The method of claim 1, wherein the transmitting of the matching information to the AMF comprises transmitting the matching information in a path switching request message.

4. The method of claim 3, wherein the target BS and the source BS perform inter-BS handover (Xn handover).

5. The method of claim 1, further comprising:
when the source BS is unable to support QoS information currently being supported and there is, in the AQP information, information matching the QoS information allowed to be supported for the UE to be served, transmitting, to the source BS, the QoS information allowed to be supported for the UE to be served.

6. The method of claim 5, wherein the transmitting to the source BS of the QoS information allowed to be supported for the UE to be served comprises
when there is, in the AQP information, a plurality of pieces of the QoS information allowed to be supported for the UE to be served, transmitting QoS information allowed to provide best QoS.

7. The method of claim 1, further comprising:
reidentifying QoS information allowed to be supported for the UE to be served after handover is performed and then transmitting the reidentified QoS information to a session management function (SMF).

8. The method of claim 1, further comprising:
transmitting a message including N2 SM information to an SMF, wherein the N2 SM information comprises information for supporting processing of the AQP information.

9. A target base station (BS) in a mobile communication system, the target BS comprising:
a communication device;
at least one memory including instructions; and
at least one processor configured to execute the instructions to control to receive, from a source BS, alternative quality of service (QoS) profile (AQP) information, determine whether information matching QoS information allowed to be supported for a user equipment (UE) to be served is included in the AQP information, and when the information matching the QoS information allowed to be supported for the UE to be served is included in the AQP information, transmit the matching information to an access and mobility management function (AMF).

10. The target BS of claim 9, wherein the at least one processor is configured to:
determine whether there is, in the AQP information, information matching at least one of a guaranteed flow bit rate (GFBR), a packet error rate (PER) or a packet delay budget (PDB) for the target BS to be able to support the UE to be served.

11. The target BS of claim 9, wherein the at least one processor is configured to:
   transmit the matching information in a path switching request message.

12. The target BS of claim 9, wherein the target BS and the source BS perform inter-BS handover (Xn handover).

13. The target BS of claim 9, wherein the at least one processor is further configured to, when the source BS is unable to support QoS information currently being supported and there is, in the AQP information, information matching the QoS information allowed to be supported for the UE to be served, control the QoS information allowed to be supported for the UE to be served to be transmitted to the source BS.

14. The target BS of claim 13, wherein the at least one processor is further configured to, when there is, in the AQP information, a plurality of pieces of the QoS information allowed to be supported for the UE to be served, control QoS information allowed to provide best QoS to be transmitted.

15. The target BS of claim 9, wherein the at least one processor is further configured to reidentify QoS information allowed to be supported for the UE to be served after handover is performed and then control the reidentified QoS information to be transmitted to a session management function (SMF).

16. The target BS of claim 9, wherein the at least one processor is further configured to control a message including N2 SM information to be transmitted to an SMF, wherein the N2 SM information comprises information for supporting processing of the AQP information.

* * * * *